US 9,785,321 B2

United States Patent
Kurabayashi

(10) Patent No.: US 9,785,321 B2
(45) Date of Patent: Oct. 10, 2017

(54) CONTROLLING A MASSIVELY MULTIPLAYER ONLINE ROLE-PLAYING GAME

(71) Applicant: Empire Technology Development LLC, Wilmington, DE (US)

(72) Inventor: Shuichi Kurabayashi, Fujisawa (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 310 days.

(21) Appl. No.: 14/359,478

(22) PCT Filed: May 30, 2013

(86) PCT No.: PCT/US2013/043281
§ 371 (c)(1),
(2) Date: May 20, 2014

(87) PCT Pub. No.: WO2014/193379
PCT Pub. Date: Dec. 4, 2014

(65) Prior Publication Data
US 2015/0293668 A1    Oct. 15, 2015

(51) Int. Cl.
A63F 9/24       (2006.01)
A63F 13/00    (2014.01)
(Continued)

(52) U.S. Cl.
CPC ........ *G06F 3/04842* (2013.01); *A63F 13/422* (2014.09); *A63F 13/67* (2014.09);
(Continued)

(58) Field of Classification Search
CPC ............ A63F 2300/30; A63F 2300/308; A63F 13/60; A63F 13/67
See application file for complete search history.

(56) References Cited

U.S. PATENT DOCUMENTS

2005/0131896 A1* 6/2005 Cao ..................... G06F 17/3061
2006/0154710 A1   7/2006 Serafat
(Continued)

FOREIGN PATENT DOCUMENTS

JP         2011156405 A       8/2011

OTHER PUBLICATIONS

"CyanoBot 1.4.0.6," Software Geek, accessed at http://web.archive.org/web/20130404033356/http://www.softwaregeek.com/download/cyanobot.html, Jul. 13, 2011, pp. 1-2.
(Continued)

*Primary Examiner* — Kang Hu
*Assistant Examiner* — Jason Pinheiro
(74) *Attorney, Agent, or Firm* — Brundidge & Stanger, P.C.

(57) ABSTRACT

Briefly stated, technologies are generally described for controlling a massively multiplayer online role-playing game (MMORPG), using a user-interface (UI) selection unit, an action log unit, a pattern detector unit and/or an artificial intelligence (AI) player unit. In various examples, a system is described, where the system may be configured to control the action log unit to record logs of a user's actions input through a UI and associate the actions with status information of the user's character and opponent characters in the MMORPG. The system may control the pattern detector unit to extract correlation rules for the status information and the associated actions. The AI player unit may control a substitute player for the user based on the correlation rules, such that the substitute player can automatically reproduce actions of the user.

19 Claims, 9 Drawing Sheets

(51) Int. Cl.
| | |
|---|---|
| G06F 17/00 | (2006.01) |
| G06F 19/00 | (2011.01) |
| G06F 3/0484 | (2013.01) |
| A63F 13/822 | (2014.01) |
| G06N 3/00 | (2006.01) |
| A63F 13/422 | (2014.01) |
| A63F 13/67 | (2014.01) |

(52) U.S. Cl.
CPC ........ *A63F 13/822* (2014.09); *G06F 3/04847* (2013.01); *G06N 3/006* (2013.01); *A63F 2300/535* (2013.01)

(56) References Cited

U.S. PATENT DOCUMENTS

| | | | | |
|---|---|---|---|---|
| 2008/0146334 | A1 | 6/2008 | Kil | |
| 2011/0319169 | A1* | 12/2011 | Lam | A63F 13/12 463/42 |
| 2012/0142429 | A1* | 6/2012 | Muller | A63F 13/795 463/42 |
| 2012/0190444 | A1* | 7/2012 | Fujisawa | A63F 13/10 463/31 |

OTHER PUBLICATIONS

"MMORPG bots," Wikipedia, accessed at http://web.archive.org/web/20130524055932/http://en.wikipedia.org/wiki/MMORPG_bots, last modified on Apr. 23, 2013, pp. 1-3.

"Self learning bot software: Ultimate Farmville Bot plays while your away!, Malware Removal Bot, An advanced gaming bot for Archlord MMORPG and more," Free Download Manager, accessed at http://www.freedownloadmanager.org/download/self-learning-bot-1817536.html, accessed on Mar. 3, 2014, pp. 1-3.

Agrawal, R., and Srikant, R., "Fast Algorithms for Mining Association Rules," Proceedings of the 20th International Conference on Very Large Data Bases, pp. 487-499 (1994).

Borbora, Z., et al., "Churn Prediction in MMORPGs Using Player Motivation Theories and an Ensemble Approach," IEEE Third International Conference on Privacy, Security, Risk and Trust, pp. 157-164 (2011).

Breining, S., et al., "Action Sequence Mining," Workshop on Machine Learning and Data Mining in Games, pp. 12 (Sep. 9, 2011).

Broll, W., "Expert opinion on the influences of bots on the economy and gaming enjoyment in MMORPGs," Bossland GmbH, pp. 41 (Mar. 29, 2012).

Harding-Rolls, P "There's life beyond World of Warcraft," Screen Digest, pp. 4 (Mar. 24, 2009).

Irvine, C., "World of Warcraft® Subscriber Base Reaches 12 Million Worldwide," accessed at http://web.archive.org/web/20130420110217/http://us.blizzard.com/en-us/company/press/pressreleases.html?id=2847881, Oct. 7, 2010, pp. 1-3.

Johnson, S., "GD col. 18: The End of Games?," Designer Notes, accessed at http://web.archive.org/web/20130125140256/http://www.designer-notes.com/?p=372, Aug. 7, 2011, pp. 1-9.

Kim, H., et al., "Detection of auto programs for MMORPGs," Proceedings of the 18th Australian Joint conference on Advances Artificial Intelligence, pp. 1281-1284 (2005).

Platzer, C., "Sequence-Based Bot Detection in Massive Multiplayer Online Games," 8th International Conference on Information, Communications and Signal Processing (ICICS), pp. 1-5 (2011).

Yee, N., et al., "Online gaming motivations scale: development and validation," Proceedings of the 2012 ACM Annual Conference on Human Factors in Computing Systems, pp. 2803-2806 (2012).

International Search Report with Written Opinion for International Application No. PCT/US2013/043281 mailed on Dec. 19, 2013.

* cited by examiner

CONTROLLING A MASSIVELY MULTIPLAYER ONLINE ROLE-PLAYING GAME

CROSS-REFERENCE TO RELATED APPLICATION

This Application is the U.S. National Stage filing under 35 U.S.C. §371 of PCT Application Ser. No. PCT/US13/43281 filed on May 30, 2013. The disclosure of the PCT Application is hereby incorporated herein by reference in its entirety.

BACKGROUND

Recently, the number of users playing a massively multiplayer online role-playing game (MMORPG) has been steadily increasing. Also, as mobile devices such as smartphones and tablet personal computers are implemented using advanced technologies for greater computing power, the users are now able to play MMORPGs on the mobile devices as well as other non-portable computing devices such as desktop computers. Since the mobile devices with such computing power enables sophisticated 3-dimensional graphic rendering, the graphics quality of the MMORPGs provided on mobile devices is now comparable to that for non-portable computing devices.

MMORPGs may be provided in the form of so-called "Play4Free (P4F)" where the users are allowed to use basic features of the games for free while they need to purchase virtual items for more advanced features. In such type of games, it is important to implement a mechanism that encourages the users to continuously play the games so that the users can be exposed to more chances for purchasing the virtual items. In particular, in order to encourage as many users as possible to regularly purchase items, it may be necessary to adjust the balance of various factors in the games so as to motivate the users to purchase the items through cooperation or competition among the users.

However, it is difficult to motivate the users having various lifestyles to continuously attend the same P4F MMORPG. For example, cooperative playing of a game may not be made between a first user, who can play the game for an ample amount of time (e.g., a student regularly playing the game for several hours a day), and a second user, who can play the game only for a limited amount of time (e.g., a regular worker intermittently playing the game at night times). In this case, the first user can constitute a volume of the game users, whereas the second user can constitute important consumers who purchase charged-for items. In light of these circumstances, MMORPGs may be configured to provide different types of games for users having different characteristics such as different levels of skills and/or different lifestyles. For examples, for novice users who tend to often switch from one game title to another, a game service provider tends to provide a web-based simple 2-dimensional user interface (UI) which can be implemented at low costs. On the other hand, for intermediate or high level users who tend to pay for advanced features, the game service provider tends to provide a full-fledged 3-dimensional UI which can be implemented at high costs.

As described above, the conventional MMORPGs provide only a single UI for each game title, such as a Web-based UT aimed at novice users or a native UI aimed at higher-level users. However, such limitation on the UI does not allow the users with different lifestyles to easily cooperate or compete in a single game platform, which results in deterioration of long-term profitability.

SUMMARY

Technologies are generally described for controlling a massively multiplayer online role-playing game (MMORPG).

Various example apparatus configured to control an MMORPG described herein may include a user-interface (UI) selection unit, an action log unit, a pattern detector unit, and/or an artificial intelligence (AI) player unit. The UI selection unit may be configured to allow a user to select a UI in the user's device. The action log unit may be configured to record logs of the user's actions input through the UI, the actions being associated with status information of the user's character and opponent characters. The pattern detector unit may be configured to extract correlation rules for the status information and the associated actions recorded in the logs. The AI player unit may be configured to control a substitute player for the user based on the correlation rules, such that the substitute player automatically reproduces actions of the user.

In some examples, methods for controlling an MMORPG are described. Example methods may include selecting, by a UI selection unit, a UI in a user's device. Logs of the user's actions input through the UI may be recorded by an action log unit. The actions may be associated with status information of the user's character and opponent characters. Correlation rules for the status information and the associated actions recorded in the logs may be extracted by a pattern detector unit. Based on the correlation rules, a substitute player for the user, which may automatically reproduce actions of the user, may be controlled by an AI player unit.

In some examples, a computer-readable storage medium is described that may be adapted to store a program for causing a processor configured to control an MMORPG. The processor may include various features as further described herein. The program may include one or more instructions for selecting, by a UI selection unit, a UI in a user's device, and recording, by an action log unit, logs of the user's actions input through the UI. The actions may be associated with status information of the user's character and opponent characters. The program may further include one or more instructions for extracting, by a pattern detector unit, correlation rules for the status information and the associated actions recorded in the logs, and controlling, by an AI player unit, a substitute player for the user based on the correlation rules. As a result, the substitute player may automatically reproduce actions of the user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
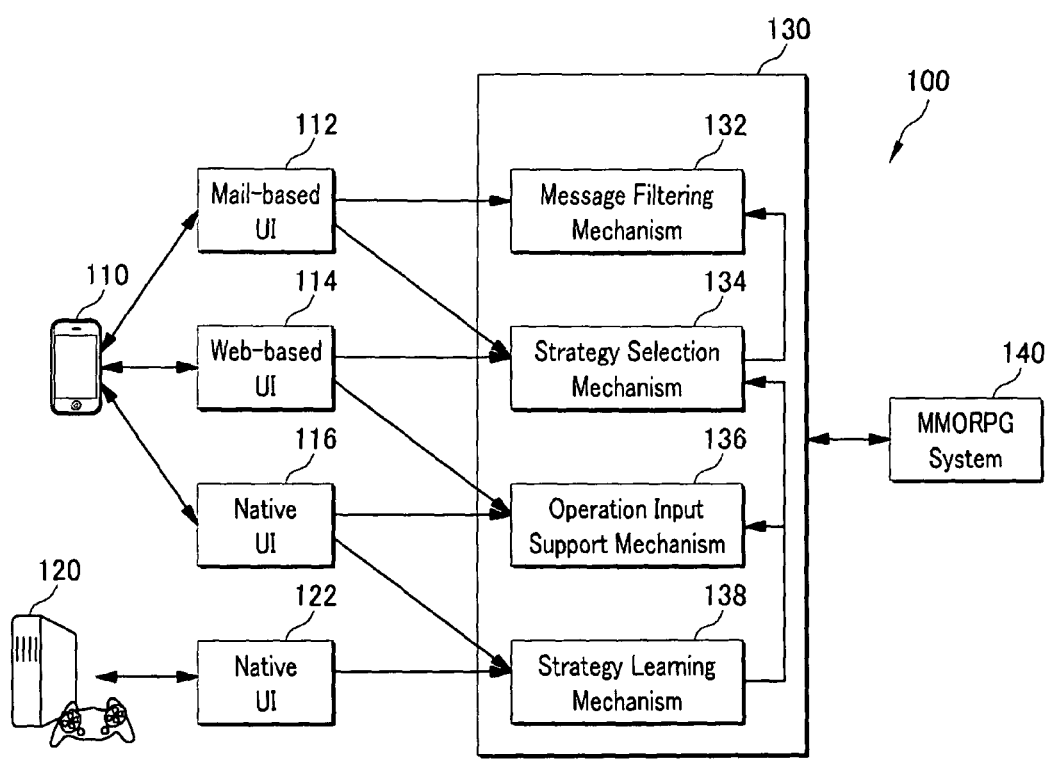
FIG. 1 schematically shows a block diagram of an illustrative example massively multiplayer online role-playing game (MMORPG) control system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices and computer program products related to controlling a massively multiplayer online role-playing game (MMORPG).

Briefly stated, technologies are generally described for controlling an MMORPG, using a user-interface (UI) selection unit, an action log unit, a pattern detector unit and/or an artificial intelligence (AI) player unit. In various examples, a system is described, where the system may be configured to control the action log unit to record logs of a user's actions input through a UI and associate the actions with status information of the user's character and opponent characters in the MMORPG. The system may control the pattern detector unit to extract correlation rules for the status information and the associated actions. The AI player unit may control a substitute player for the user based on the correlation rules, such that the substitute player can automatically reproduce actions of the user.

In some embodiments, the UI selection unit may be further configured to report the user's actions to the action log unit if the user has selected a native UI. For example, the native UI may include at least one of a native UI for a game console and a native UI for a mobile device.

In some embodiments, the UI selection unit may be further configured to request the AI player unit to construct the substitute player if the user has selected a non-native UI. For example, the non-native UI may include at least one of a web-based UI and a mail-based UI.

In some embodiments, the pattern detector unit may be further configured to calculate frequencies of occurrence of all the user's action combinations and select co-occurrence patterns having frequencies exceeding a predetermined threshold as action patterns having high probabilities of co-occurrence. Also, the pattern detector unit may be configured to extract the correlation rules according to an Apriori algorithm.

FIG. 1 schematically shows a block diagram of an illustrative example MMORPG control system, arranged in accordance with at least some embodiments described herein. As depicted, a MMORPG control system 100 may include a mobile device 110, a game console 120, a multi-stage user-experience control system 130, and an MMORPG system 140. Multi-stage user-experience control system 130 may be configured to learn game strategies of a user based on the user's actions input through various UIs and control an AI player (e.g., a substitute player for the user) to automatically reproduce actions for the user. For example, the game strategies may be learned based on the user's actions input through a native UI while the user plays the game on a game console. Also, the AI player may be controlled to reproduce the actions while the user cannot interactively play the game, e.g., while commuting to work on a train or working at offices.

In some embodiments, multi-stage user-experience control system 130 may include a message filtering mechanism 132, a strategy selection mechanism 134, an operation input support mechanism 136, and a strategy learning mechanism 138. As described below, these mechanisms 132 to 138 may be collectively configured to learn game strategies of a user based on the user's actions input through various UIs and provide different levels of automation of the AI player according to the complexity of the UIs selected by the user' device such as a mobile device, a game console, etc.

In some embodiments, a user of a game console 120 may use a native UI 122 for connecting to a MMORPG system 140 through multi-stage user-experience control system 130. Native UI 122 may allow the user to input various types of commands for controlling the actions of the user's virtual character (which may be referred to as an avatar) in the MMORPG. Such commands for controlling the actions of the user's virtual character may be input by selecting corresponding UI items provided on native UI 122 (e.g., movement keys and shoot buttons on a joystick of game console 120, or buttons displayed on a screen of native UI 122). Alternatively and/or additionally, the commands may be input by performing a macro command representing one or more actions or a combination thereof through native UI 122.

The commands representing one or more actions of the user's virtual character may be forwarded to strategy learning mechanism 138 of multi-stage user-experience control system 130. In response to the input commands, strategy learning mechanism 138 may be configured to extract correlation rules for the actions represented by the commands and the status information of the user's virtual character and environment (e.g., other cooperative user's virtual character, opponent's virtual character, a monster, etc.), which will be described in detail later.

In some embodiments, a user of a mobile device 110 such as a smartphone may also use a native UI 116 for connecting to MMORPG system 140 through multi-stage user-experience control system 130. Native UI 116 may allow the user to input various types of commands for controlling the actions of the user's virtual character in the MMORPG, while native UI 116 may have a smaller number of UI items (e.g., a limited number of buttons arranged on several-inches long screen of native UI 116, etc.) compared to UI 122.

Similarly to UI 122, commands for controlling one or more actions of the user's virtual character may be input by selecting corresponding UI items provided on native UI 116. Again, the commands representing one or more actions of the user's virtual character may be forwarded to strategy learning mechanism 138 of multi-stage user-experience control system 130, such that strategy learning mechanism 138 may extract correlation rules for the actions represented by the commands and the status information of the user's virtual character and environment.

Additionally, operation input support mechanism 136 may be configured to receive the correlation rules from strategy learning mechanism 138 and rearrange the UI items on UI 116 in its order or positions according to the correlation rules. In this manner, UI 116 may recommend some UI items representing commands preferred by the user based on the correlation rules. This may be useful in a situation where the user has a limited access to the game through the mobile device 110 and at the same time wants to enjoy an interactive control of the game. Further, operation input support mechanism 136 may receive commands from the user through any one of the UI items arranged on UI 116, which may, in turn, forward the commands to MMORPG system 140 for further processing.

In some embodiments, a user of mobile device 110 may choose to use a web-based UI 114 for connecting to MMORPG system 140 through multi-stage user-experience control system 130. Web-based UI 114 may allow the user to input a limited number of commands for controlling the actions of the user's virtual character in the MMORPG. For example, web-based UI 114 may be configured to display static images of the environment in the MMORPG and provide a smaller number of UI items compared to UI 116. More specifically, the UI items arranged on UI 114 may be used to allow the user to select one of some representative game strategies for controlling an AI player. Additionally, the UI items may allow the user to select an interactive playing mode in which the user can play the game in such an interactive manner as provided by native UI 116.

Strategy selection mechanism 134 may be configured to receive the correlation rules from strategy learning mechanism 138 and rearrange the UI items on UI 114 in its order or positions according to the correlation rules. Further, strategy selection mechanism 134 may receive a command from the user through any one of the UI items arranged on UI 114, which may, in turn, forward the commands to MMORPG system 140 for further processing. Further, the command representing a game strategy may be forwarded to operation input support mechanism 136 for further processing as described above.

In some embodiments, a user of mobile device 110 may choose to use a mail-based UI 112 for connecting to MMORPG system 140 through multi-stage user-experience control system 130. Mail-based UI 112 may allow the user to input a very limited number of commands for controlling the actions of the user's virtual character in the MMORPG. For example, mail-based UI 112 may display static images of the environment in the MMORPG and provide a smaller number of UI items compared to UI 114. More specifically, message filtering mechanism 132 may be configured to allow the user to select one of some representative strategies for controlling an AI player, through the UI items arranged on UI 112.

Message filtering mechanism 132 may be further configured to rearrange the UI items on UI 112 based on feedback from strategy selection mechanism 134. Also, message filtering mechanism 132 may provide notification to the user through mail-based UI 112 when a significant change in the environment in the MMORPG. A command representing a game strategy input through UI 112 may be forwarded to MMORPG system 140 for further processing. Further, the command may be forwarded to strategy selection mechanism 134 for further processing as described above.

Figure 2:
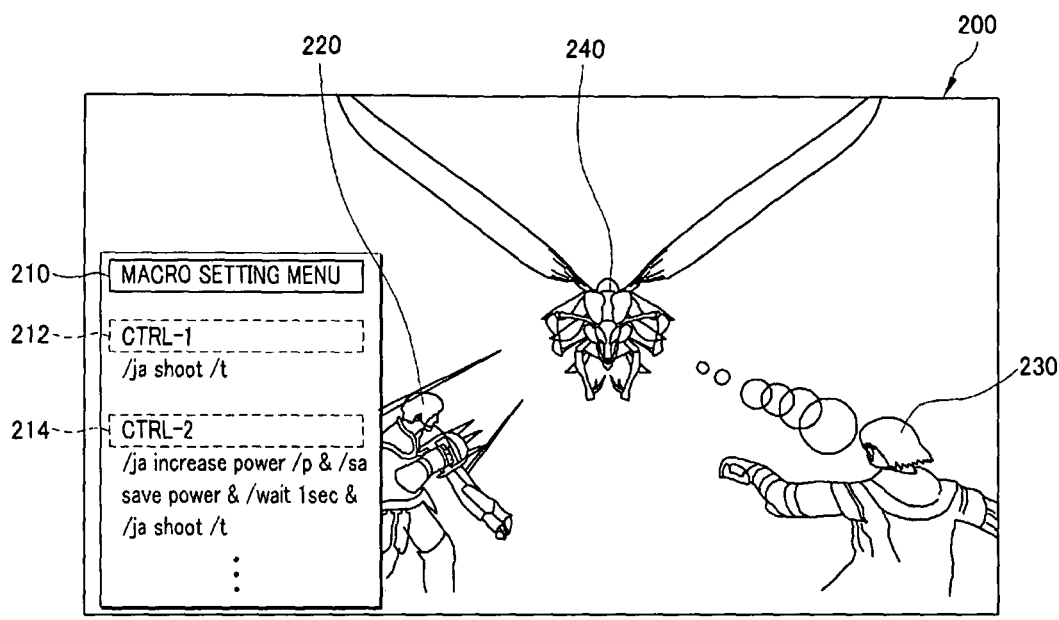
FIG. 2 schematically shows an illustrative example screen provided by a native UI for a game console.

FIG. 2 schematically shows an illustrative example screen provided by a native UI for a game console, arranged in accordance with at least some embodiments described herein. As depicted, a screen 200 provided by a native UI such as native UI 122 may show the user's virtual character 220, another cooperative user's virtual character 230, and an opponent character 240. For example, when the user manipulates buttons on game console 120, native UI 122 may receive commands associated with the buttons and send the commands representing one or more actions to strategy learning mechanism 138.

In some embodiments, a sequence of commands may be input through native UI 122 by using a macro-type command. As shown in FIG. 2, a macro setting menu 210 may be provided, where the user may input macro keys 212 and 214 and a sequence of commands associated with each of macro keys 212 and 214. For example, macro key 212 ("CTRL-1") may be associated with a sequence of commands "/ja shoot /t" which represents a job ability ("/ja") of shooting ("shoot") against a target opponent ("/t"). Also, macro key 214 ("CTRL-2") may be associated with a sequence of commands "/ja increase power /p & /sa save power & /wait 1 sec & /ja shoot /t" which represents a job ability ("/ja") of increasing power ("increase power") for the user ("/p"), a skill ability ("/sa") of saving power ("save power" for about 1 second ("/wait 1 sec"), and an additional job ability ("/ja") of shooting ("shoot") against a target opponent ("/t"). Using such a macro-type command, the user may be able to input a combination of various commands in a convenient and efficient manner. Also, native UI 122 may receive a macro-type command when the user manipulates a macro key associated the macro-type command, and send one or more actions represented by the command to strategy learning mechanism 138.

Figure 3:
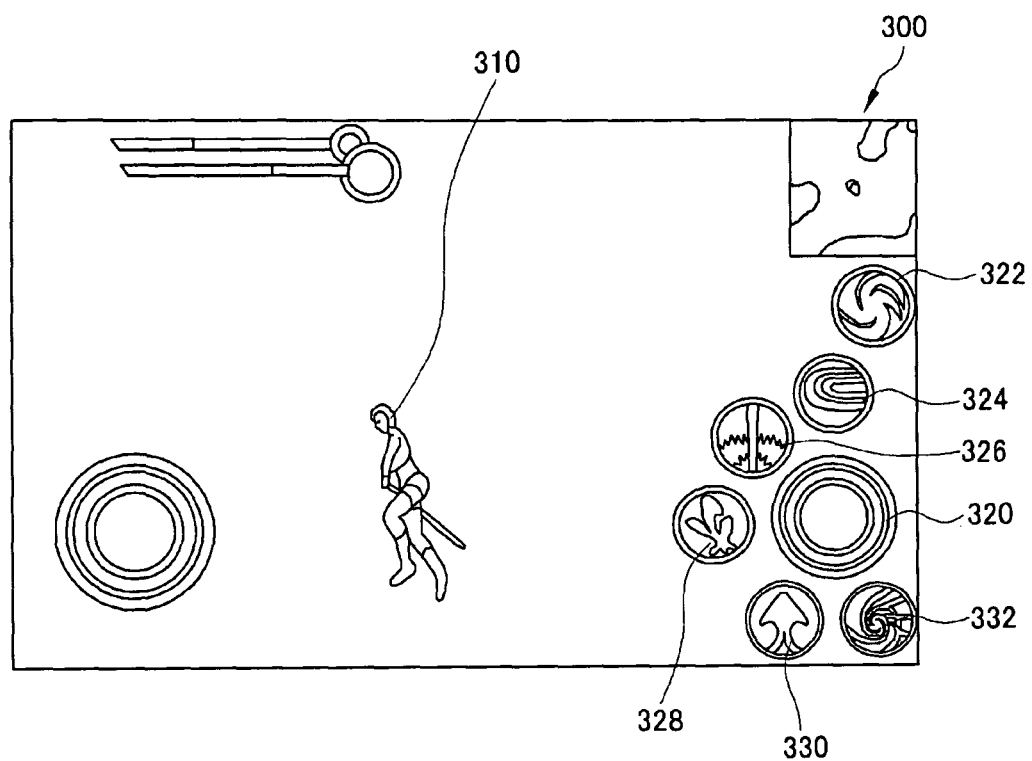
FIG. 3 schematically shows an illustrative example screen provided by a native UI for a mobile device.

FIG. 3 schematically shows an illustrative example screen provided by a native UI for a mobile device, arranged in accordance with at least some embodiments described herein. As depicted, a screen 300 provided by a native UI such as native UI 116 may show the user's virtual character 310, and a plurality of UI items such as buttons 320, 322, 324, 326, 328, 330 and/or 332. In one embodiment, screen 300 may be a touch-sensitive screen. In this case, when the user touches any one of buttons 320 to 332 on screen 300, native UI 116 may receive one or more commands associated with the selected button and send one or more actions represented by the commands to operation input support mechanism 136 or strategy learning mechanism 138.

In some embodiments, the user of the mobile device may customize the arrangements of buttons 320 to 332 according to his/her preference. Also, as described above, operation input support mechanism 136 may rearrange buttons 320 to 332 on screen 300 in its order or positions and/or selectively arrange some of buttons 320 to 332 according to the correlation rules extracted by strategy learning mechanism 138.

Accordingly, screen 300 of the native UI may selectively arrange buttons 320 to 332 according to the user's preferred strategies and actions.

Figure 4:
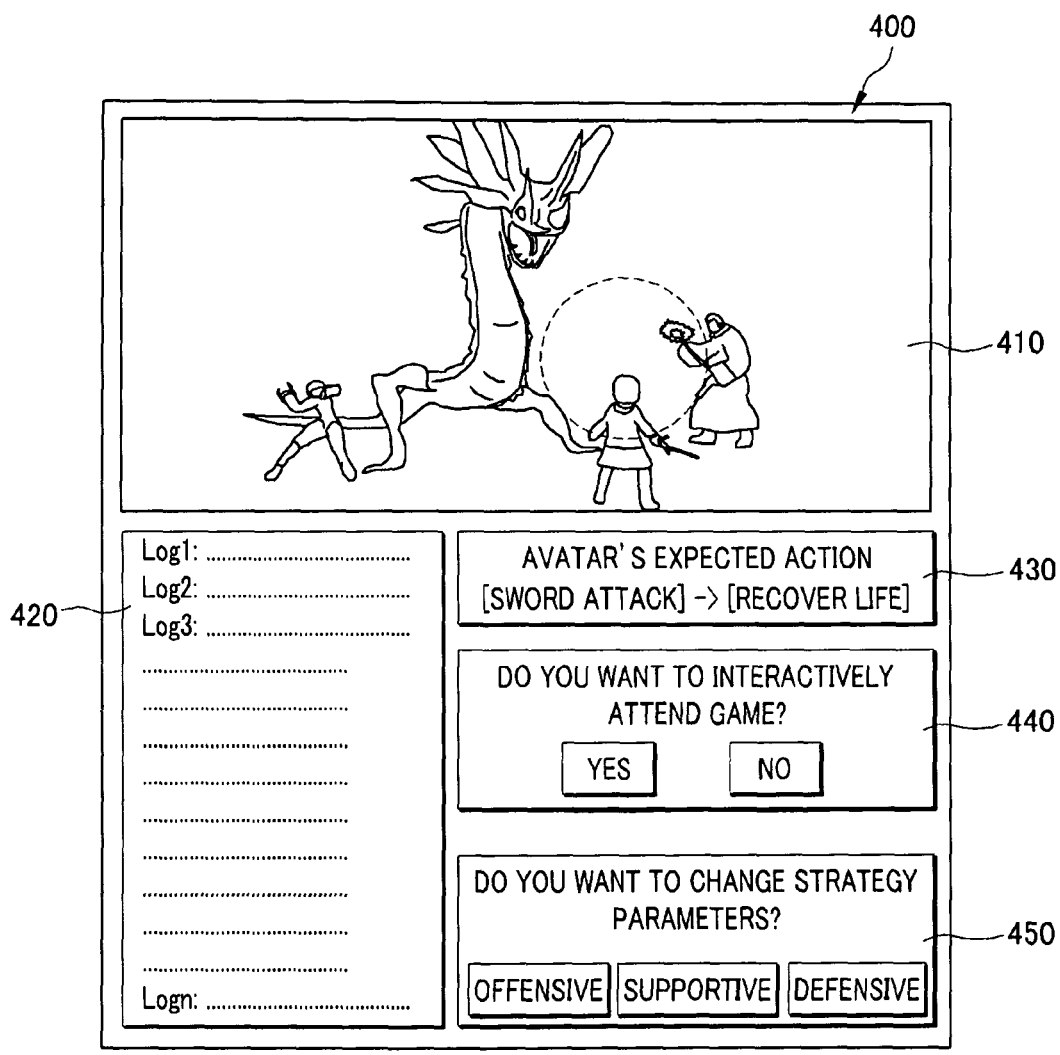
FIG. 4 schematically shows an illustrative example screen provided by a web-based UI for a mobile device.

FIG. 4 schematically shows an illustrative example screen provided by a web-based UI for a mobile device, arranged in accordance with at least some embodiments described herein. As depicted, a screen 400 provided by a web-based UI such as web-based UI 114 may show a static image frame 410 illustrating the current status of environment where the user's virtual character, any other cooperative user's character(s), and/or an opponent character are involved. In some embodiments, if a sufficient network bandwidth between the mobile device and an MMORPG system such as MMORPG system 140 is available, a moving image of the environment may be rendered in the image frame 410. Further, if a web browser running on the mobile device supports for 3-dimensional graphic rendering functionality, a 3-dimensional image of the environment may be rendered in the image frame 410.

In some embodiments, screen 400 of the web-based UI may include a list 420 of action logs showing a sequence of actions performed by the user's virtual character. Additionally, screen 400 may include an avatar's expected action 430 showing what next action (e.g., recover life) can be expected from the current action (e.g., sword attack). Such change of the avatar's action may be determined based on the user's selected strategy.

In some embodiments, the web-based UI may provide one or more modes for the user to select for playing the user's virtual character. For example, the web-based UI may provide two modes such as an avatar playing mode and an interactive playing mode. In the avatar playing mode, an AI player may substitute for the user to play the user's virtual character, which may be controlled according to the user's selected strategy or the correlation rules extracted by strategy learning mechanism 138. As illustrated in FIG. 4, the user may be allowed to switch from the avatar playing mode to the interactive playing mode by selecting "YES" button in a UI item 440.

Also, the web-based UI may selectively arrange buttons representing one or more game strategies. For example, the web-based UI may provide three buttons labeled as "OFFENSIVE," "SUPPORTIVE," and "DEFENSIVE," respectively, in a UI item 450 such that the user can select one of the buttons for a preferred strategy. The user may select to interactively attend the game while watching the current status of the environment in the image frame 410 and the avatar's expected action in the UI item 430.

Figure 5:
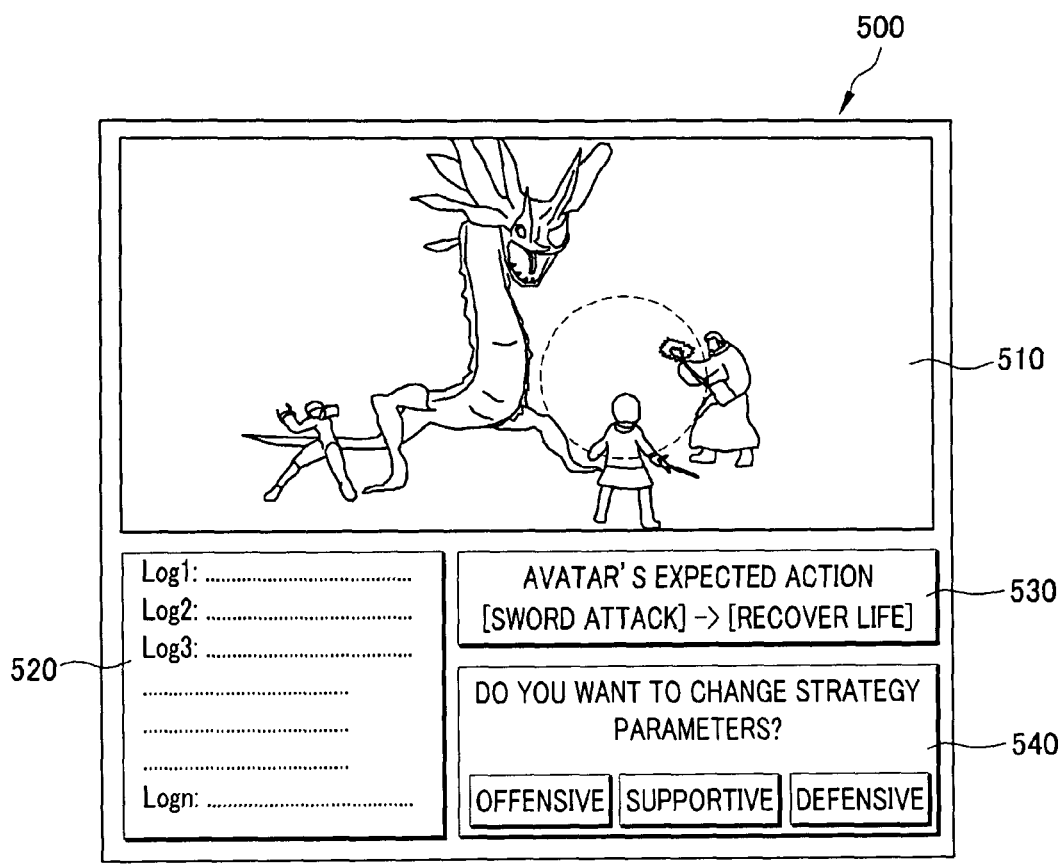
FIG. 5 schematically shows an illustrative example screen provided by a mail-based UI for a mobile device.

FIG. 5 schematically shows an illustrative example screen provided by a mail-based UI for a mobile device, arranged in accordance with at least some embodiments described herein. As depicted, a screen 500 provided by a mail-based UI such as mail-based UI 112 may show a static image frame 510 illustrating the current status of environment where the user's virtual character, any other cooperative user's character(s), and/or an opponent character are involved. In some embodiments, if the mail-based UI is enabled to process a dynamic content such as HTML, JavaScript, etc., a moving image of the environment may be rendered in the image frame 510.

In some embodiments, screen 500 of the mail-based UI may include a list 520 of action logs showing a sequence of actions performed by the user's virtual character. Additionally, screen 500 may include an avatar's expected action 530 showing what next action (e.g., recover life) can be expected from the current action (e.g., sword attack). Such change of the avatar's action may be determined based on the user's selected strategy.

In some embodiments, the mail-based UI may selectively arrange buttons representing one or more game strategies. For example, the mail-based UI may provide three buttons labeled as "OFFENSIVE," "SUPPORTIVE," and "DEFENSIVE," respectively, in a UI item 540 such that the user can select one of the buttons for a preferred strategy. The user may select to interactively attend the game while watching the current status of the environment in the image frame 510 and the avatar's expected action in the UI item 530.

Figure 6:
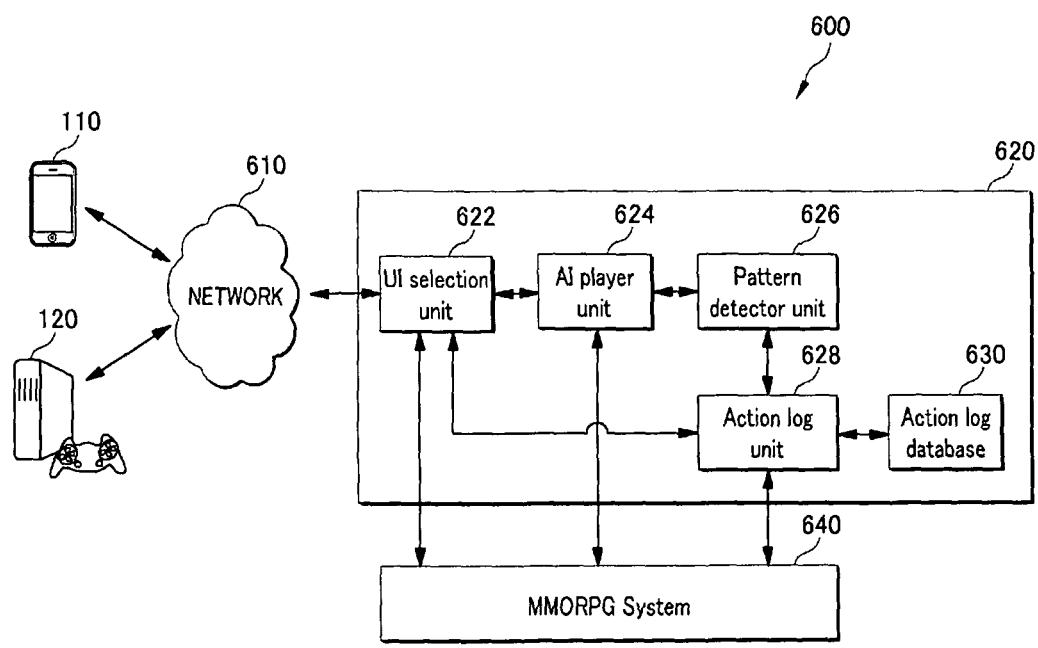
FIG. 6 schematically shows a block diagram of an illustrative example MMORPG control system.

FIG. 6 schematically shows a block diagram of an illustrative example MMORPG control system, arranged in accordance with at least some embodiments described herein. As depicted, a MMORPG control system 600 may include a mobile device 110, a game console 120, a multi-stage user-experience control system 620 coupled to mobile device 110 and game console 120 through a network 610, and an MMORPG system 640. Multi-stage user-experience control system 620 may be configured to learn game strategies of users based on the users' actions input through various UIs and control an AI player to automatically reproduce actions for the users in the MMORPG. For example, the game strategies may be learned based on the user's actions input through a native UI while the user plays the game on a game console. Also, the AI player may be controlled to reproduce the actions while the user cannot interactively play the game, e.g., while commuting to work on a train or working at offices.

In some embodiments, multi-stage user-experience control system 620 may include an UI selection unit 622, an AI player unit 624, a pattern detector unit 626, an action log unit 628, and an action log database 630. As described below, these units 622 to 630 may be collectively configured to learn game strategies of a user based on the user's actions input through various UIs and provide different levels of automation of the AI player according to the complexity of the UIs selected by the user' device such as a mobile device, a game console, etc.

In some embodiments, UI selection unit 622 may be configured to allow the user to select a UI depending on his/her lifestyles and current conditions such as TPO (time, place, and occasion). For example, if the user is available to interactively and constantly play the MMORPG through a game, console for several hours, the user may select a native UI such as UI 122. Alternatively, the user may select a native UI provided on a mobile device such as native UI 116. In such cases, UI selection unit 622 may report the user's actions to action log unit 628 so that action log unit 628 records the reported actions in action log database 630. On the other hand, when the user selects a non-native UI such as web-based UI 114 or mail-based UI 112 through UI selection unit 622, multi-stage user-experience control system 620 may control AI player unit 624 to construct a substitute AI player to reproduce actions for the user while the user is not available to interactively play the MMORPG.

In some embodiments, action log unit 628 may be configured to record the logs of the user's actions input through UI selection unit 622 in action log database 630. Additionally, action log unit 628 may record, in action log database 630, status information of the user's virtual character, other cooperative user's virtual character as well opponent characters along with its associated actions. For example, the status information may include at least one of power and skill levels, current life, armors possessed by the characters, etc.

In some embodiments, pattern detector unit 626 may be configured to extract correlation rules for the status information and the associated actions recorded in action log database 630. For example, a correlation rule indicating that "action B is to be taken in status A" may be denoted as {A}→{B}. In each correlation rule, the left-hand side (LHS) of "→" may be referred to as an antecedent, while the right-hand side (RHS) of "→" may be referred to as a consequence. The correlation rules may be extracted using any suitable logic inference algorithm such as an Apriori algorithm.

Further, pattern detector unit 626 may calculate frequencies of occurrence of all the user's action combinations and select co-occurrence patterns having frequencies exceeding a predetermined threshold as action patterns having high probabilities of co-occurrence. For example, when there are n types of actions available in MMORPG control system 600 and the average number of actions taken before completion of a game is r, the total number of co-occurrence patterns of game actions may be represented by $_nH_r$ indicating a repeated combination of choosing r actions from n types of actions. $_nH_r$ may be calculated according to the following formula:

$$_nH_r = {_{n+r-1}}C_r = \binom{n+r-1}{r} = \frac{|(n+r-1)|}{r|(n-1)|}.$$

Pattern detector unit 626 may calculate the frequencies of occurrence of all action combinations from the action log database 630 and select co-occurrence patterns having frequencies exceeding the predetermined threshold (e.g., 20%) as action patterns having high probabilities of co-occurrence. In this manner, it is possible to extract situation-dependent action patterns and combinations of actions preferred by the user (action patterns based on combinations of actions). These two types of action pattern information are forwarded to AI player unit 624 in multi-stage user-experience control system 620.

In some embodiments, AI player unit 624 may be configured to construct an AI player to act as the user's substitute that automatically reproduces actions. This functionality of AI player unit 624 may be useful when the user may not be available to interactively play the MMORPG, e.g., while commuting to work or working in offices. Such actions may be reproduced according to the correlation rules extracted by pattern detector unit 626.

Figure 7:
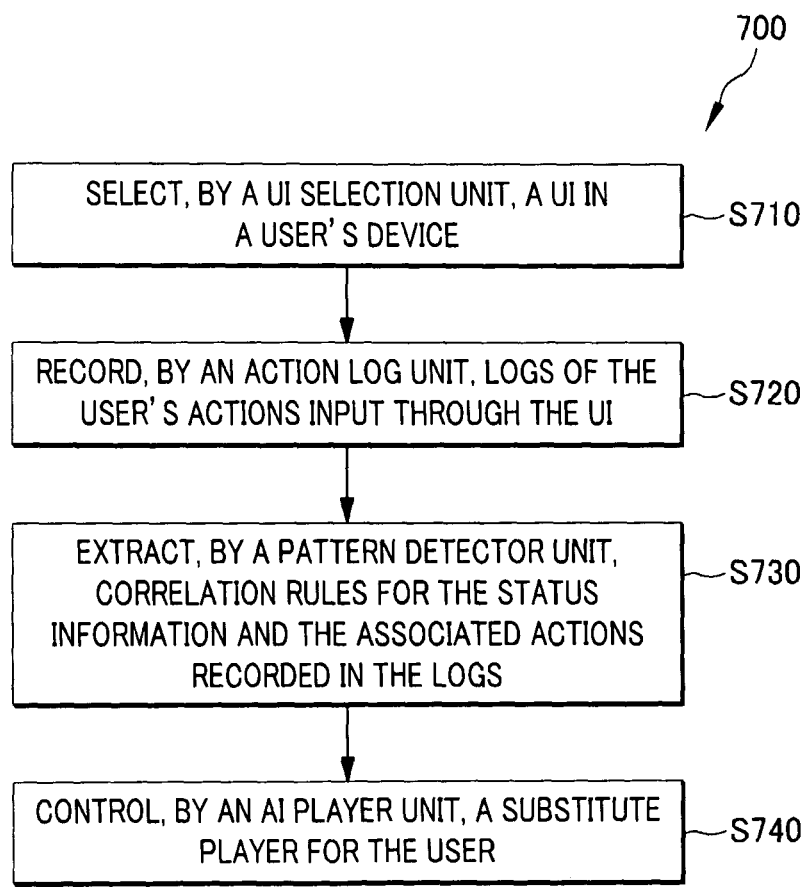
FIG. 7 illustrates an example flow diagram of a method adapted to control an MMORPG system.

FIG. 7 illustrates an example flow diagram of a method adapted to control an MMORPG system, arranged in accordance with at least some embodiments described herein. An example method 700 in FIG. 7 may be implemented using, for example, a computing device including a processor adapted to control an MMORPG system.

Method 700 may include one or more operations, actions, or functions as illustrated by one or more of blocks S710, S720, S730 and/or S740. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof. Method 700 may begin at block S710, "SELECT, BY A UI SELECTION UNIT, A UI IN A USER'S DEVICE."

At block S710, an UI may be selected by a UI selection unit. As depicted in FIGS. 1 and 6, UI selection unit 622 of multi-stage user-experience control system 620 may allow the user to select a UI depending on his/her lifestyles and conditions. For example, if the user is available to play the MMORPG through a game console such as game console 120 for several hours, the user may select a native UI such as UI 122. Alternatively, the user may select a native UI such as native UI 116 provided on a mobile device such as mobile device 110. In some other instances, the user may select a non-native UI such as web-based UI 114 or mail-based UI 112 if he/she is not available to interactively play the game. Block S710 may be followed by block S720, "RECORD, BY AN ACTION LOG UNIT, LOGS OF THE USER'S ACTIONS INPUT THROUGH THE UI."

At block S720, logs of the user's actions input through the selected UI may be recorded by an action log unit. As illustrated in FIGS. 1 and 6, action log unit 628 may be configured to record the logs of the user's actions input through UI selection unit 622 in action log database 630. Also, action log unit 628 may record, in action log database 630, status information of the user's virtual character, other cooperative user's virtual character as well opponent characters along with its associated actions. Block S720 may be followed by block S730, "EXTRACT, BY A PATTERN DETECTOR UNIT, CORRELATION RULES FOR THE STATUS INFORMATION AND THE ASSOCIATED ACTIONS RECORDED IN THE LOGS."

At block S730, correlation rules for the status information and the associated actions recorded in the logs may be extracted by a pattern detector unit. As illustrated in FIGS. 1 and 6, pattern detector unit 626 may be configured to extract correlation rules for the status information and the associated actions recorded in action log database 630. The correlation rules may be extracted using any suitable logic inference algorithm such as an Apriori algorithm.

In some embodiments, pattern detector unit 626 may calculate frequencies of occurrence of all the user's action combinations and select co-occurrence patterns having frequencies exceeding a predetermined threshold as action patterns having high probabilities of co-occurrence. In this manner, it is possible to extract situation-dependent action patterns and combinations of actions preferred by the user (action patterns based on combinations of actions). These two types of action pattern information are forwarded to AI player unit 624 in multi-stage user-experience control system 620. Block S730 may be followed by block S740, "CONTROL, BY AN AI PLAYER UNIT, A SUBSTITUTE PLAYER FOR THE USER."

At block S740, a substitute player for the user may be controlled by an AI player unit. As depicted in FIGS. 1 and 6, AI player unit 624 may be configured to control the AI player to act as the user's substitute that automatically reproduces actions in the absence of the user. Such actions may be reproduced according to on the correlation rules extracted by pattern detector unit 626.

One skilled in the art will appreciate that, for this and other methods disclosed herein, the functions performed in the methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

According to the above embodiments of the present disclosure, users having different lifestyles and/or different levels of skills may cooperatively attend a same MMORPG because various UIs are provided to the users according to their lifestyles and conditions. In some embodiments, a user who may not be available to interactively play the game may be notified by a MMORPG control system such as system 100 or 600 to encourage them to purchase charged-for items for improving the status of the game.

In some other embodiments, when it is detected that the number of users accessing to an MMORPG system is significantly increasing, the system may send a notification to the users indicating that free-of-charge items may be provided for switching from an interactive playing mode to an avatar playing mode. In this manner, the number of simultaneous network accesses can be reduced and thus the overload of the system can be prevented.

Additionally, in some embodiments, as users get accustomed to playing games with the assistance of AI players, the user may become hesitant to switch from the current game title to another provided by another MMORPG service provider. This leads to a lock-in effect of MMORPG service provided according to the present disclosure.

Figure 8:
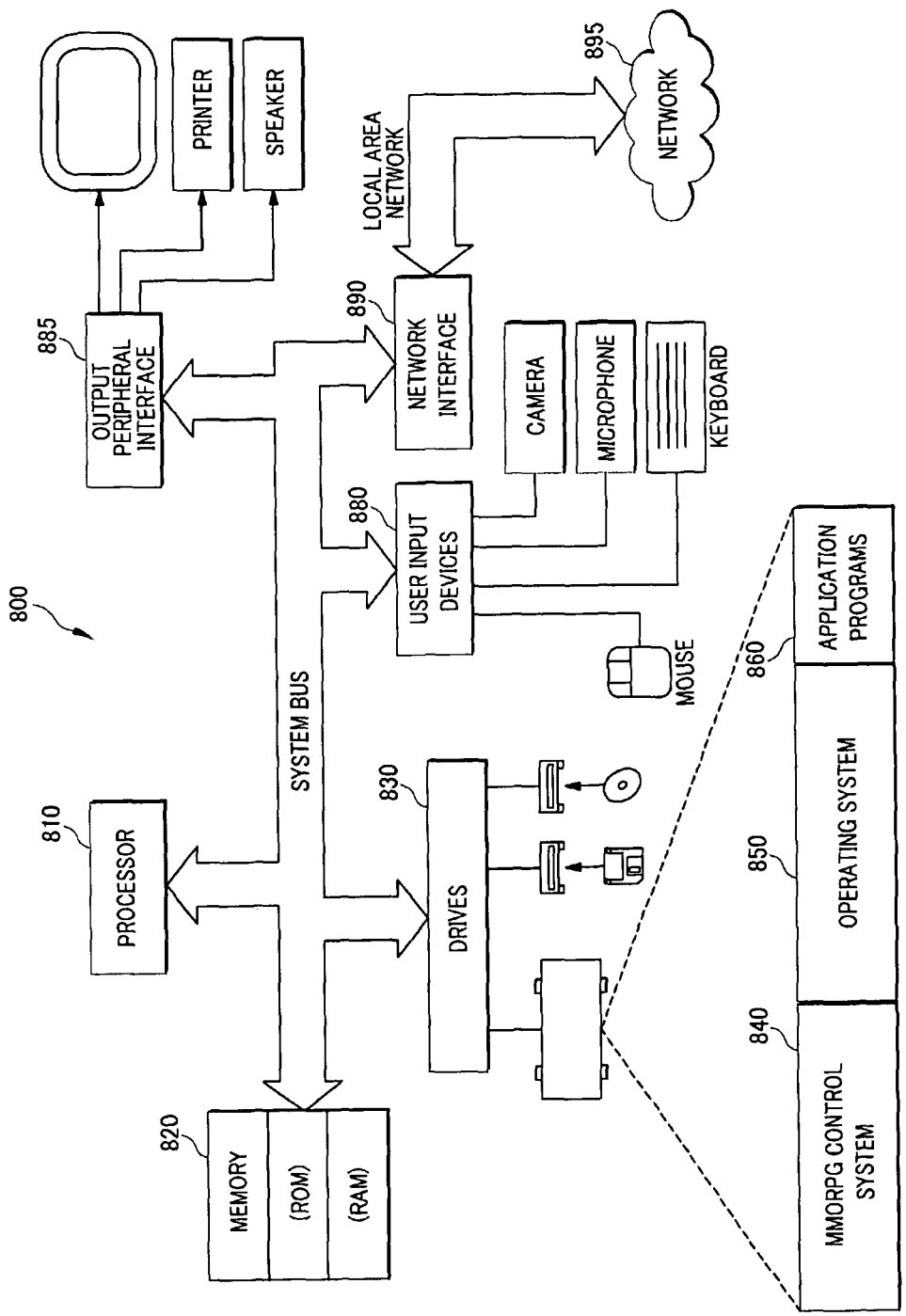
FIG. 8 shows a schematic block diagram illustrating an example computing system that can be configured to perform methods for controlling an MMORPG.

FIG. 8 shows a schematic block diagram illustrating an example computing system that can be configured to perform methods for controlling an MMORPG system, arranged in accordance with at least some embodiments described herein. As depicted in FIG. 8, a computer 800 may include a processor 810, a memory 820 and one or more drives 830. Computer 800 may be implemented as a conventional computer system, an embedded control computer, a laptop computer, or a server computer, a smartphone, a tablet computer, a set-top box, a kiosk, a vehicular information system, a mobile telephone, a customized machine, or other hardware platform.

Drives 830 and their associated computer storage media may provide storage of computer readable instructions, data structures, program modules and other data for computer 800. Drives 830 may include an MMORPG control system 840, an operating system (OS) 850, and application programs 860. MMORPG control system 840 may be adapted to control an MMORPG system in such a manner as described above with respect to FIGS. 1 to 7.

Computer 800 may further include user input devices 880 through which a user may enter commands and data. Input devices can include an electronic digitizer, a camera, a microphone, a keyboard and pointing device, commonly referred to as a mouse, trackball or touch pad. Other input devices may include a joystick, game pad, satellite dish, scanner, or the like.

These and other input devices can be coupled to processor 810 through a user input interface that is coupled to a system bus, but may be coupled by other interface and bus structures, such as a parallel port, game port or a universal serial bus (USB). Computers such as computer 800 may also include other peripheral output devices such as display devices, which may be coupled through an output peripheral interface 885 or the like.

Computer 800 may operate in a networked environment using logical connections to one or more computers, such as a remote computer coupled to a network interface 890. The remote computer may be a personal computer, a server, a router, a network PC, a peer device or other common network node, and can include many or all of the elements described above relative to computer 800.

Networking environments are commonplace in offices, enterprise-wide area networks (WAN), local area networks (LAN), intranets, and the Internet. When used in a LAN or WLAN networking environment, computer 800 may be coupled to the LAN through network interface 890 or an adapter. When used in a WAN networking environment, computer 800 typically includes a modem or other means for establishing communications over the WAN, such as the Internet or a network 895. The WAN may include the Internet, the illustrated network 895, various other networks, or any combination thereof. It will be appreciated that other mechanisms of establishing a communications link, ring, mesh, bus, cloud, or network between the computers may be used.

In some embodiments, computer 800 may be coupled to a networking environment. Computer 800 may include one or more instances of a physical computer-readable storage medium or media associated with drives 830 or other storage devices. The system bus may enable processor 810 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 820, whether characterized as RAM, ROM, flash, or other types of volatile or non-volatile memory technology. The media may also represent secondary storage, whether implemented as storage drives 830 or otherwise. Hard drive implementations may be characterized as solid state, or may include rotating media storing magnetically encoded information.

Processor 810 may be constructed from any number of transistors or other circuit elements, which may individually or collectively assume any number of states. More specifically, processor 810 may operate as a state machine or finite-state machine. Such a machine may be transformed to a second machine, or specific machine by loading executable instructions. These computer-executable instructions may transform processor 810 by specifying how processor 810 transitions between states, thereby transforming the transistors or other circuit elements constituting processor 810 from a first machine to a second machine. The states of either machine may also be transformed by receiving input from user input devices 880, network interface 890, other peripherals, other interfaces, or one or more users or other actors. Either machine may also transform states, or various physical characteristics of various output devices such as printers, speakers, video displays, or otherwise.

Figure 9:
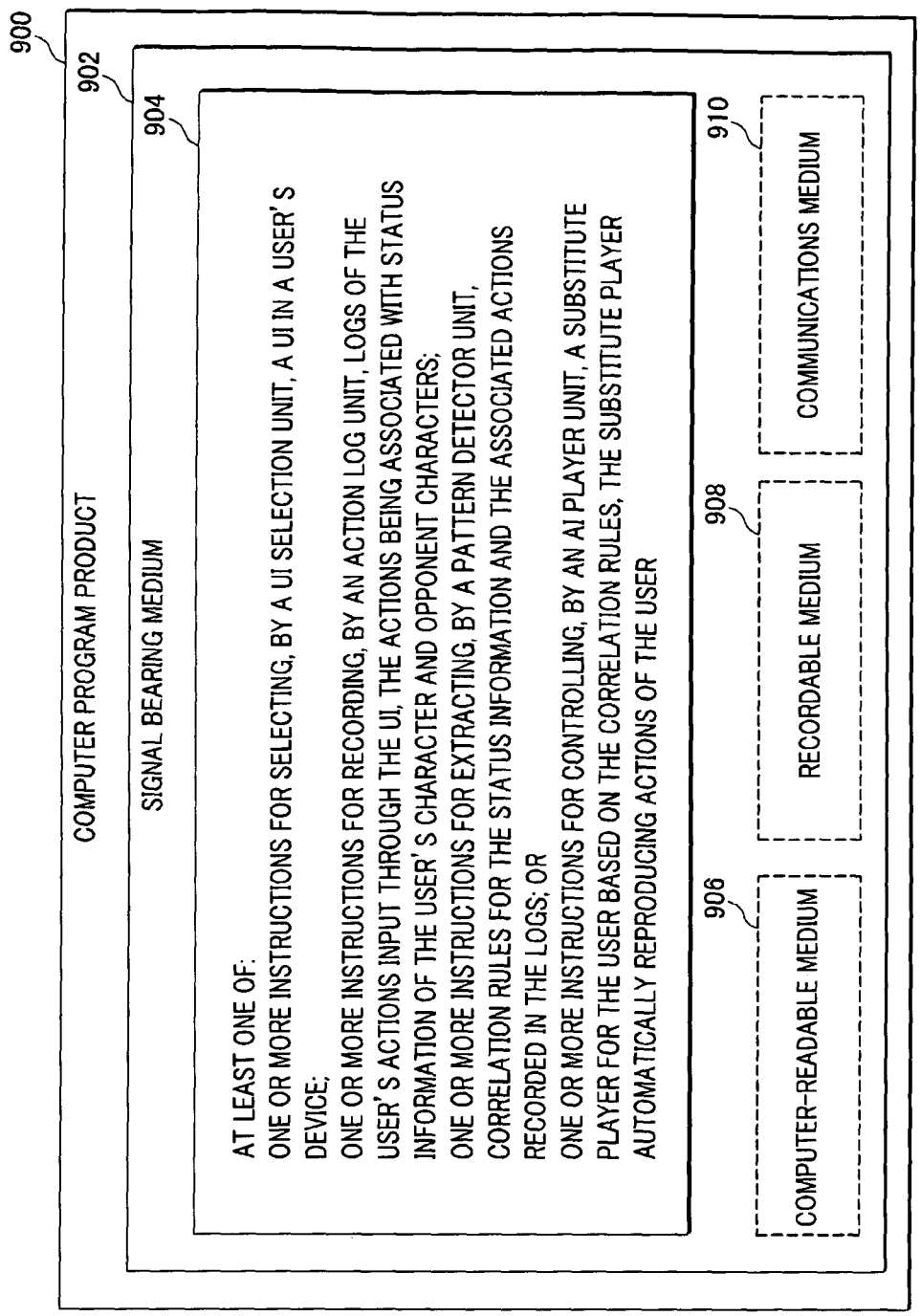
FIG. 9 illustrates computer program products that can be utilized to control an MMORPG system, all arranged in accordance with at least some embodiments described herein.

FIG. 9 illustrates computer program products 900 that can be utilized to operate an MMORPG control system in accordance with at least some embodiments described herein. Computer program product 900 may include a signal bearing medium 902. Signal bearing medium 902 may include one or more instructions 904 that, when executed by, for example, a processor, may provide the functionality described above with respect to FIGS. 1 to 7. By way of example, instructions 904 may include at least one of: one or more instructions for selecting, by a UI selection unit, a UI in a user's device; one or more instructions for recording, by an action log unit, logs of the user's actions input through the UI, the actions being associated with status information of the user's character and opponent characters; one or more instructions for extracting, by a pattern detector unit, correlation rules for the status information and the associated actions recorded in the logs; or one or more instructions for controlling, by an AI player unit, a substitute player for the user based on the correlation rules, the substitute player automatically reproducing actions of the user. Thus, for example, referring to FIGS. 1 and 6, an MMORPG control system 100 or 600 may undertake one or more of the blocks shown in FIG. 7 in response to instructions 904.

In some implementations, signal bearing medium 902 may encompass a computer-readable medium 906, such as, but not limited to, a hard disk drive (HDD), a Compact Disc (CD), a Digital Video Disk (DVD), a digital tape, memory, etc. In some implementations, signal bearing medium 902 may encompass a recordable medium 908, such as, but not limited to, memory, read/write (R/W) CDs, R/W DVDs, etc. In some implementations, signal bearing medium 902 may encompass a communications medium 910, such as, but not limited to, a digital and/or an analog communication medium (e.g., a fiber optic cable, a waveguide, a wired communication link, a wireless communication link, etc.). Thus, for example, computer program product 900 may be conveyed to one or more modules of MMORPG control system 100 or 600 by an RF signal bearing medium 902, where the signal bearing medium 902 is conveyed by a wireless communication medium 910 (e.g., a wireless communication medium conforming with the IEEE 802.11 standard).

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system to control a massively multiplayer online role-playing game (MMORPG), the system comprising:
   a processor configured to execute instructions in communication with a memory that stores the instructions to provide:
      a user-interface (UI) selection unit configured to allow a user to select a UI in a user's device; and
      an action log unit configured to record logs of inputs for user's actions through the UI, the user's actions being associated with status information of a user character and opponent characters;
   a pattern detector unit configured to:
      extract correlation rules for the status information and the associated user's actions recorded in the logs,
      calculate frequencies of occurrence of all user's action combinations, and
      select co-occurrence patterns that have frequencies which exceed a predetermined threshold as action patterns that have high probabilities of co-occurrence; and
   an artificial intelligence (AI) player unit configured to control a substitute player for the user based on the correlation rules and the selected co-occurrence patterns, such that the substitute player automatically reproduces actions of the user.

2. The system of claim 1, wherein the UI selection unit is further configured to report the user's actions to the action log unit if the user has selected a native UI.

3. The system of claim 2, wherein the native UI comprises at least one of a native UI for a game console and a native UI for a mobile device.

4. The system of claim 1, wherein the UI selection unit is further configured to request the AI player unit to construct the substitute player if the user has selected a non-native UI.

5. The system of claim 4, wherein the non-native UI comprises at least one of a web-based UI and a mail-based UI.

6. The system of claim 1, wherein the status information includes at least one of: power and skill levels, current life, and armors possessed by the user character and the opponent characters.

7. The system of claim 1, wherein the pattern detector unit is configured to extract the correlation rules according to an Apriori algorithm.

8. A method to control a massively multiplayer online role-playing game (MMORPG), the method comprising:
   selecting, by a user-interface (UI) selection unit, a UI in a user's device;
   recording, by an action log unit, logs of inputs for user's actions through the UI, the user's actions being associated with status information of a user character and opponent characters;
   extracting, by a pattern detector unit, correlation rules for the status information and the associated user's actions recorded in the logs;
   calculating, by the pattern detector unit, frequencies of occurrence of all user's action combinations;
   selecting, by the pattern detector unit, co-occurrence patterns that have frequencies which exceed a predetermined threshold as action patterns that have high probabilities of co-occurrence; and
   controlling, by an artificial intelligence (AI) player unit, a substitute player for the user based on the correlation rules and the selected co-occurrence patterns, such that the substitute player automatically reproduces actions of the user.

9. The method of claim 8, wherein the selecting the UI comprises reporting the user's actions to the action log unit if the user has selected a native UI.

10. The method of claim 9, wherein the selecting the UI comprises selecting at least one of a native UI for a game console and a native UI for a mobile device.

11. The method of claim 8, wherein the selecting the UI comprises requesting the AI player unit to construct the substitute player if the user has selected a non-native UI.

12. The method of claim 11, wherein the selecting the UI comprises selecting at least one of a web-based UI and a mail-based UI.

13. The method of claim 8, wherein the extracting the correlation rules comprises extracting the correlation rules according to an Apriori algorithm.

14. A non-transitory computer-readable storage medium which stores a program to cause a processor configured to control a massively multiplayer online role-playing game (MMORPG), the program comprising one or more instructions for:
   selecting, by a user-interface (UI) selection unit, a UI in a user's device;
   recording, by an action log unit, logs of inputs for user's actions through the UI, the user's actions being associated with status information of a user character and opponent characters;
   extracting, by a pattern detector unit, correlation rules for the status information and the associated user's actions recorded in the logs;
   calculating, by the pattern detector unit, frequencies of occurrence of all user's action combinations;
   selecting, by the pattern detector unit, co-occurrence patterns that have frequencies which exceed a predetermined threshold as action patterns that have high probabilities of co-occurrence; and
   controlling, by an artificial intelligence (AI) player unit, a substitute player for the user based on the correlation rules and the selected co-occurrence patterns, such that the substitute player automatically reproduces actions of the user.

15. The medium of claim 14, wherein the selecting the UI comprises reporting the user's actions to the action log unit if the user has selected a native UI.

16. The medium of claim 15, wherein the selecting the UI comprises selecting at least one of a native UI for a game console and a native UI for a mobile device.

17. The medium of claim 14, wherein the selecting the UI comprises requesting the AI player unit to construct the substitute player if the user has selected a non-native UI.

18. The medium of claim 17, wherein the selecting the UI comprises selecting at least one of a web-based UI and a mail-based UI.

19. The medium of claim 14, wherein the extracting the correlation rules comprises extracting the correlation rules according to an Apriori algorithm.

\* \* \* \* \*

UNITED STATES PATENT AND TRADEMARK OFFICE
CERTIFICATE OF CORRECTION

PATENT NO. : 9,785,321 B2  
APPLICATION NO. : 14/359478  
DATED : October 10, 2017  
INVENTOR(S) : Kurabayashi Page 1 of 1

It is certified that error appears in the above-identified patent and that said Letters Patent is hereby corrected as shown below:

In the Specification

Column 6, Line 5, delete "UT" and insert -- UI --, therefor.

Column 6, Line 15, delete "UT" and insert -- UI --, therefor.

Column 8, Line 46, delete "game, console" and insert -- game console --, therefor.

Column 9, Line 20, delete "$_aH_r$" and insert -- $_nH_r$ --, therefor.

Column 13, Line 17, delete "communication medium" and insert -- communications medium --, therefor.

Signed and Sealed this  
Twenty-fourth Day of April, 2018

Andrei Iancu  
*Director of the United States Patent and Trademark Office*